United States Patent
Han et al.

(10) Patent No.: US 10,050,769 B2
(45) Date of Patent: Aug. 14, 2018

(54) TIME SYNCHRONIZATION METHOD AND APPARATUS

(71) Applicant: China Mobile Communications Corporation, Beijing (CN)

(72) Inventors: Liuyan Han, Beijing (CN); Han Li, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/597,696

(22) Filed: May 17, 2017

(65) Prior Publication Data

US 2017/0250791 A1   Aug. 31, 2017

Related U.S. Application Data

(63) Continuation of application No. PCT/CN2015/094503, filed on Nov. 13, 2015.

(30) Foreign Application Priority Data

Nov. 17, 2014 (CN) .......................... 2014 1 0655696

(51) Int. Cl.
*H04L 7/00* (2006.01)
*H04J 3/06* (2006.01)

(52) U.S. Cl.
CPC .......... *H04L 7/0012* (2013.01); *H04J 3/0602* (2013.01); *H04J 3/0667* (2013.01); *H04J 3/0697* (2013.01)

(58) Field of Classification Search
CPC .................................................... H04L 7/0012
See application file for complete search history.

(56) References Cited

U.S. PATENT DOCUMENTS

| 8,964,790 B2 | 2/2015 | Saito et al. |
| 2009/0213828 A1* | 8/2009 | Brundage ............. G01S 5/0289 370/338 |
| 2013/0121347 A1 | 5/2013 | Saito et al. |

(Continued)

FOREIGN PATENT DOCUMENTS

| CN | 102223197 A | 10/2011 |
| CN | 102332973 A | 1/2012 |

(Continued)

OTHER PUBLICATIONS

International Search Report in International Application No. PCT/CN2015/094503, dated Jan. 29, 2016.

(Continued)

*Primary Examiner* — Ross Varndell
(74) *Attorney, Agent, or Firm* — Mintz Levin Cohn Ferris Glovsky and Popeo, P.C.; Kongsik Kim; Carolina E. Säve

(57) ABSTRACT

Disclosed is a time synchronization method and apparatus. The method includes: receiving a time synchronization message sent by an upstream device through a clock port; obtaining a message rate parameter in the time synchronization message; according to the message rate parameter, correcting a time synchronization message loss detection parameter of a slave clock port, wherein the time synchronization message loss detection parameter is used to detect whether the time synchronization message is lost; and according to a correction result, keeping clock synchronization with the upstream device.

18 Claims, 2 Drawing Sheets

(56) References Cited

U.S. PATENT DOCUMENTS

2013/0287154 A1    10/2013  Tomita
2015/0163000 A1*    6/2015  Aweya ................. H04J 3/0602
                                                            370/519

FOREIGN PATENT DOCUMENTS

| CN | 102761407 A  | 10/2012 |
| CN | 103441833 A  | 12/2013 |
| CN | 103684739 A  |  3/2014 |
| CN | 103905135 A  |  7/2014 |
| EP | 2 770 678 A1 |  8/2014 |

OTHER PUBLICATIONS

English Translation of the Written Opinion of the International Search Authority in International Application No. PCT/ CN2015/ 094503, dated Jan. 29, 2016.
Supplementary European Search Report dated May 4, 2018 in corresponding EP Application No. 15861042.8.
M. Mayer, Nortel Networks, "Draft G.8265.1 IEEE1588™ profile for telecom (frequency delivery without support from network nodes) V0.11", ITU-T Draft; Study period 2009-2012, International Telecommunication Union, Geneva; vol. 13, Sep. 21, 2010, pp. 1-29.
Chinese Patent Office Communication dated Apr. 27, 2018 in corresponding Chinese Application No. 201410655696.1.

* cited by examiner

TIME SYNCHRONIZATION METHOD AND APPARATUS

CROSS-REFERENCES TO RELATED APPLICATIONS

The application is a continuation of International Application No. PCT/CN2015/094503 filed on Nov. 13, 2015, which claims priority to Chinese Patent Application No. 201410655696.1 filed on Nov. 17, 2014, the entire disclosures of which are incorporated herein by reference.

TECHNICAL FIELD

The disclosure relates to the field of communication technology, and in particular to a time synchronization method and apparatus.

BACKGROUND

Uniform and precise time is required and applied in fields such as mobile communications, electricity, finance and sensing. The way of terrestrial transmission time synchronization is to transfer time information to each terminal device through the time synchronization protocol of terrestrial transmission network. In the Ethernet, to achieve precise timing, corresponding clock synchronization needs to be achieved.

At present, clock synchronization is achieved through the transfer of a message of precise time synchronization protocol, that is, achieving synchronization of clocks across the whole network through the synchronization with the same reference clock in the network. In the network, the time synchronization message for keeping time synchronization can be transferred by means of multicast. A master clock sends a time synchronization message to all connected downstream devices in the form of multicast, and a slave clock receives the time synchronization message. The slave clock responds to the received time synchronization message, generates a time synchronization response message and sends the time synchronization response message to the master clock. Under the situation, the same time synchronization message transmission rate must be set for each clock in a network. If the time synchronization message transmission rate is inconsistent, normal synchronization can not be ensured, thus making the reliability of the entire network low.

In the present situation, the clocks of each device in the entire network must be configured uniformly to achieve the interworking and time synchronization performance of the entire network. Therefore, for the entire network, when a device joins or exits, all clocks of each device in the entire network need re-configuration, leading to poor versatility. Furthermore, if a configuration error occurs to one of the devices, a device alarm will be caused, making the reliability of the entire network low.

SUMMARY

The disclosure provides a time synchronization method and apparatus to solve the problem of poor versatility and low network reliability during achievement of clock synchronization in the existing clock synchronization network.

A time synchronization method includes: receiving, through a slave clock port, a time synchronization message sent by an upstream device; obtaining a message rate parameter in the time synchronization message; according to the message rate parameter, correcting a time synchronization message loss detection parameter, for detecting whether the time synchronization message is lost, of a slave clock port; and keeping clock synchronization with the upstream device according to a correction result.

Through the above technical solution, in the time synchronization network, it is unnecessary to manually and mandatorily set a uniform message rate. Through the extraction of the message rate parameter, automatic adaptation of the clock port can be achieved, and when it is detected that the time synchronization message is lost, misjudgement or false alarm will not happen for each device in the time synchronization network despite of the influence of non-uniform message rates, which can solve the existing problem of poor versatility and low network reliability during the achievement of clock synchronization in the clock synchronization network.

Keeping clock synchronization with the upstream device according to a correction result includes: if the time synchronization message sent by the upstream device is not received during a set duration with the corrected time synchronization message loss detection parameter as a reference, determining clock desynchronization with the upstream device.

Through the above technical solution, when it is detected that the time synchronization message is lost, misjudgement or false alarm will not happen for each device in the time synchronization network despite of the influence of non-uniform message rates.

After obtaining a message rate parameter in the time synchronization message, the method further includes: sending the time synchronization response message to the upstream device according to the obtained message rate parameter.

Through the above technical solution, each device in the time synchronization network can automatically achieve a uniform message rate level by level, no manual setting is needed, and versatility is good.

After obtaining a message rate parameter in the time synchronization message, the method further includes: updating a sending rate parameter, wherein the sending rate parameter is the rate parameter of the time synchronization message that is sent to a downstream device through a master clock port and is used to keep time synchronization with the downstream device; and sending the time synchronization message to the downstream device according to the updated sending rate parameter.

Through the above technical solution, each device in the time synchronization network can automatically achieve a uniform message rate level by level, no manual setting is needed, and versatility is good.

Sending the time synchronization message to the downstream device according to the updated sending rate parameter includes: when the update of the sending rate parameter is determined, triggering the sending of the time synchronization message to the downstream device according to the updated sending rate parameter; or when the update of the sending rate parameter is determined, and a pre-determined time is reached, triggering the sending of the time synchronization message to the downstream device according to the updated sending rate parameter.

Through the above technical solution, when the message rate in the time synchronization network changes, the new message can be triggered immediately, the problem that the message rate change may cause misjudgement of packet loss is solved and immediate update of sending message rate of the downstream device is achieved.

A time synchronization apparatus includes: an interface module, configured to receive a time synchronization message sent by an upstream device though a slave clock port; a message rate parameter extracting module, configured to obtain a message rate parameter in the time synchronization message; a message loss detection module, configured to correct a time synchronization message loss detection parameter of a slave clock port according to the message rate parameter, wherein the time synchronization message loss detection parameter is configured to detect whether the time synchronization message is lost; and a clock synchronization module, configured to keep clock synchronization with the upstream device according to a correction result.

Through the above technical solution, in the time synchronization network, it is unnecessary to manually and mandatorily set a uniform message rate. Through the extraction of the message rate parameter, automatic adaptation of the clock port can be achieved, and when it is detected that the time synchronization message is lost, misjudgement or false alarm will not happen for each device in the time synchronization network despite of the influence of non-uniform message rates, which can solve the existing problem of poor versatility and low network reliability during the achievement of clock synchronization in the clock synchronization network.

The clock synchronization module is configured to, if the time synchronization message sent by the upstream device is not received during a set duration with the corrected time synchronization message loss detection parameter as a reference, determine the clock desynchronization with the upstream device.

Through the above technical solution, when it is detected that the time synchronization message is lost, misjudgement or false alarm will not happen for each device in the time synchronization network despite of the influence of non-uniform message rates.

The interface module is further configured to send the time synchronization response message to the upstream device according to the obtained message rate parameter.

Through the above technical solution, each device in the time synchronization can automatically achieve message rate uniformity level by level, no manual setting is needed, and versatility is good.

The apparatus further includes: a message rate setting module, configured to update a sending rate parameter, wherein the sending rate parameter is the rate parameter of the time synchronization message that is sent to a downstream device through a master clock port and is used to keep time synchronization with the downstream device; and send the time synchronization message to the downstream device according to the updated sending rate parameter.

Through the above technical solution, each device in the time synchronization network can automatically achieve a uniform message rate level by level, no manual setting is needed, and versatility is good.

The message rate setting module is configured to, when the update of the sending rate parameter is determined, trigger the sending of the time synchronization message to the downstream device according to the updated sending rate parameter; or when the update of the sending rate parameter is determined, and when a pre-determined time is reached, trigger the sending of the time synchronization message to the downstream device according to the updated sending rate parameter.

Through the above technical solution, when the message rate in the time synchronization network changes, the new message can be triggered immediately, the problem that the message rate change may cause misjudgement of message loss is solved and immediate update of sending message rate of the downstream device is achieved.

DETAILED DESCRIPTION

In the present situation, the clock of each device in the entire network must be configured uniformly to realize the interworking and time synchronization of the entire network, leading to poor versatility. Furthermore, if a configuration error occurs to one of the devices, a device alarm will be caused, making the reliability of the entire network low. In view of this, a time synchronization method is provided in embodiments of the disclosure. The method includes: obtaining a message rate parameter in the time synchronization message; correcting a time synchronization message loss detection parameter according to the message rate parameter; and keeping clock synchronization with the upstream device according to a correction result. In this way, the problem of poor versatility and low network reliability during the achievement of clock synchronization in the clock synchronization network is solved.

Hereinafter, with reference to the figures, detailed description will be made to the main principle, embodiments and corresponding advantageous effects of the technical solutions of the disclosure.

First Embodiment

Figure 1:
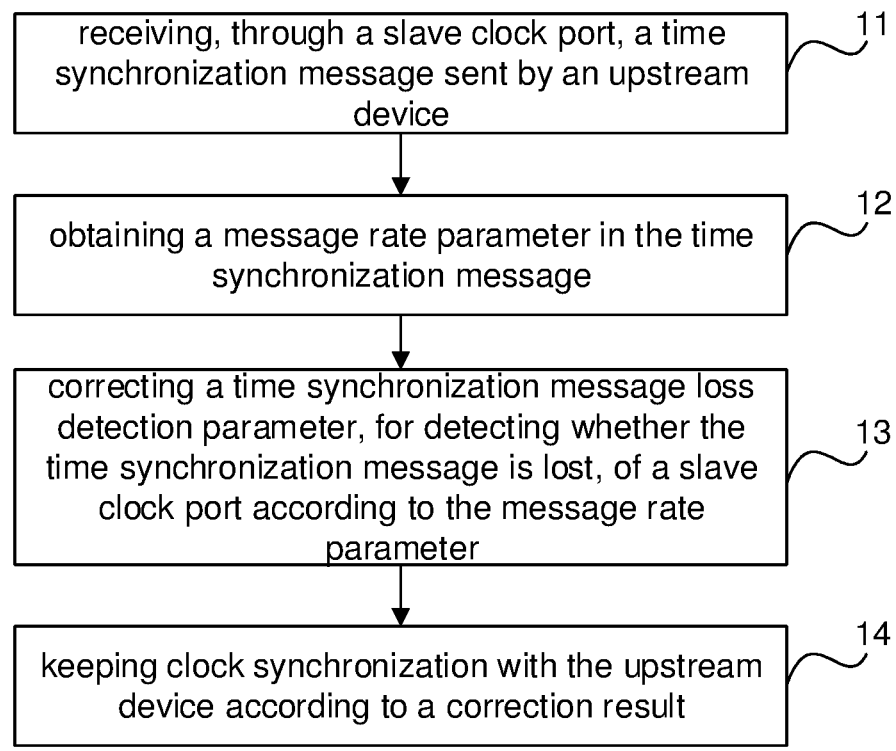
FIG. 1 is a flowchart of a time synchronization method according to a first embodiment of the disclosure.

The first embodiment of the disclosure provides a time synchronization method. As shown in FIG. 1, the specific processing procedure is as follows.

In Step 11, a time synchronization message sent by an upstream device is received through a slave clock port.

In the technical solution provided in the first embodiment of the disclosure, each device in the clock synchronization network includes one or more slave clock ports and one or more master clock ports. The slave clock port receives the time synchronization message sent by the upstream device connected with the device in which the slave clock port is located, and the master clock port is used to send the time synchronization message to a downstream device connected with the master clock port.

In Step 12, a message rate parameter in the time synchronization message is obtained.

An IEEE-1588 time synchronization message carries a logMessageInterval parameter in the message header of the time synchronization message. The message header of the time synchronization message contains 34 bytes in total. The logMessageInterval parameter in the message header contains a message rate parameter.

The message rate parameter is hexadecimal. If the message rate parameter is 16 messages every second, that is, receiving or sending the time synchronization message for 16 times every second, the value of the message rate parameter will be 0x04.

A preferred embodiment is: in the technical solution provided in the embodiment of the disclosure, when the time synchronization message is received, the logMessageInterval parameter is obtained from the message of the received time synchronization message; and according to the obtained logMessageInterval parameter, the received message rate parameter of the time synchronization message is determined.

In Step 13, according to the message rate parameter, a time synchronization message loss detection parameter of a slave clock port is corrected. The time synchronization message loss detection parameter is used to detect whether the time synchronization message is lost.

When the message rate parameter is obtained, that is, when the message rate parameter in the time synchronization message sent by the upstream device is detected, the slave clock port acquires a time interval at which the upstream device sends the time synchronization message, the clock can automatically adjust the loss detection parameter of the port. For example, the slave clock port reports an alarm when successive 5 time synchronization messages are lost, then if the slave clock port acquires the time synchronization message sent by the upstream device once every second, the time synchronization message loss detection parameter of the slave clock port will be set to report the alarm when the time synchronization message is not received in 5 seconds; and if the slave clock port acquires the time synchronization message sent by the upstream device 2 times every second, the time synchronization message loss detection parameter of the slave clock port will be set to report the alarm when the message is not received in 2.5 seconds.

In Step 14, according to a correction result, clock synchronization with the upstream device is kept.

If the time synchronization message sent by the upstream device is not received during a set duration with the corrected time synchronization message loss detection parameter as a reference, the clock desynchronization with the upstream device can be determined. Furthermore, after the clock desynchronization with the upstream device is determined, the alarm can be sent. According to the corrected time synchronization message loss detection parameter, the slave clock port detects whether the time synchronization message received by the port is lost. For example, if the time synchronization message should be received once every second according to the determined message rate parameter while the time synchronization message is not received in N seconds, the slave clock port can consider the time synchronization message sent by the upstream device is lost, then determine the clock desynchronization with the upstream device, and thus can send the alarm. As another example, if the time synchronization message should be received once every 2 seconds according to the determined message rate parameter while the time synchronization message is not received in 2*N seconds, the slave clock port can consider the time synchronization message sent by the upstream device is lost, then determine the clock desynchronization with the upstream device, and thus send the alarm.

After the message rate parameter is obtained in Step 12, the method further includes:
the time synchronization response message is sent to the upstream device according to the obtained message rate parameter.

After the message rate parameter is obtained in Step 12, the method further includes:
a sending rate parameter is updated; and according to the updated sending rate parameter, the time synchronization message is sent to the downstream device.

The sending rate parameter is the rate parameter of the time synchronization message that is sent to a downstream device through a master clock port and is used to keep time synchronization with the downstream device.

Specially, update of the sending rate parameter may be the update of sending rate parameter according to the message rate parameter, or may be a proactive modification to the sending rate parameter.

Sending of the time synchronization message to the downstream device according to the updated sending rate parameter may be implemented in either of the following two manners.

First, when the update of the sending rate parameter is determined, the sending of the time synchronization message to the downstream device is triggered according to the updated sending rate parameter.

Here, when the update of the sending rate parameter is determined, the master clock port is triggered immediately to send the time synchronization message to the downstream device according to the updated sending rate parameter. The time synchronization message sent at this time contains the updated sending rate parameter. After receiving the time synchronization message, the downstream device can immediately obtain the updated message rate parameter so that the message loss detection and sending rate of the downstream device will not be affected.

Second, when the update of the sending rate parameter is determined, and when a pre-determined time is reached, the time synchronization message is sent to the downstream device according to the updated sending rate parameter.

Here, the message rate parameter obtained by the slave clock port is taken as the sending rate parameter of the master clock port to send the time synchronization message, and the master clock port sends the time synchronization message according to the sending rate parameter. In this way, the clock network can automatically achieve time synchronization level by level.

Second Embodiment

Figure 2:
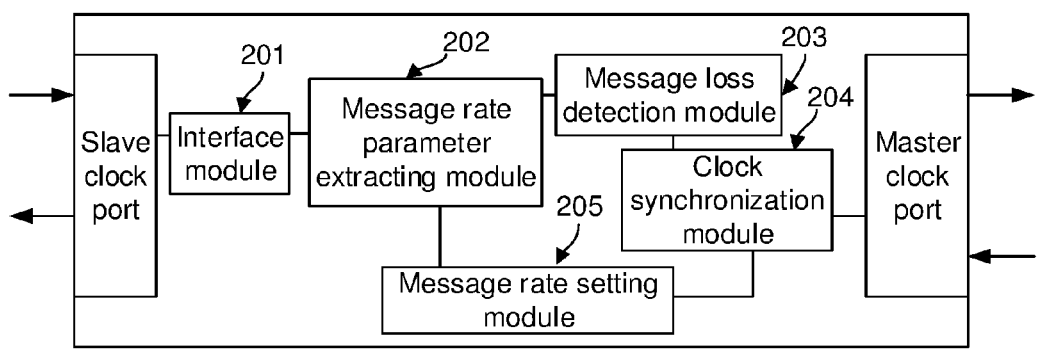
FIG. 2 is a structural diagram of a time synchronization apparatus according to a second embodiment of the disclosure.

The second embodiment of the disclosure provides a time synchronization apparatus. As shown in FIG. 2, the specific structure is as follows.

An interface module 201 is configured to receive, through a slave clock port, a time synchronization message sent by an upstream device.

A message rate parameter extracting module 202 is configured to obtain a message rate parameter in the time synchronization message.

A message loss detection module 203 is configured to, according to the message rate parameter, correct a time synchronization message loss detection parameter of a slave clock port, wherein the time synchronization message loss detection parameter is used to detect whether the time synchronization message is lost.

A clock synchronization module 204 is configured to keep clock synchronization with the upstream device according to a correction result.

Specifically, the clock synchronization module 204 is configured to, if the time synchronization message sent by the upstream device is not received during a set duration with the corrected time synchronization message loss detection parameter as a reference, determine the clock desynchronization with the upstream device.

The interface module is further configured to:
send the time synchronization response message to the upstream device according to the obtained message rate parameter.

The time synchronization apparatus further includes:

a message rate setting module 205, configured to update a sending rate parameter, wherein the sending rate parameter is the rate parameter of the time synchronization message that is sent to a downstream device by a master clock port and is used to keep time synchronization with the downstream device; and send the time synchronization message to the downstream device according to the updated sending rate parameter.

Specifically, the message rate setting module 205 is configured to, when the update of the sending rate parameter is determined, trigger the sending of the time synchronization message to the downstream device according to the updated sending rate parameter; or when the update of the sending rate parameter is determined, and a pre-determined time is reached, trigger the sending of the time synchronization message to the downstream device according to the updated sending rate parameter.

Through the above technical solutions provided in the embodiments of the disclosure, in the case that the sending of the time synchronization message is inconsistent in the time synchronization network, for example, if time synchronization message transmission rate set by the downstream device is higher than the time synchronization message transmission rate set by the upstream device, the downstream device may consider that the upstream device lost messages and thus the upstream device and the downstream device can not implement normal time synchronization; or if the time synchronization message transmission rate set by the downstream device is lower than the time synchronization message transmission rate set by the upstream device, the downstream device cannot correctly receive or respond to the time synchronization message sent by the upstream device. In these cases, according to the embodiments of the disclosure, the message rate parameter in the received time synchronization messages is obtained to dynamically adjust time synchronization message sending rate of time synchronization messages, thus achieving automatic time synchronization across the whole network. In the entire time synchronization network, it is unnecessary to mandatorily set a uniform time synchronization message receiving or sending rate, thus achieving automatic adaptation of the slave clock port or the master clock port.

Those skilled in the art should recognize that embodiments of the disclosure can be provided as products of method, apparatus (device) or computer program. Therefore, the disclosure can take the form of full hardware embodiments, full software embodiments or embodiments combining software and hardware. Furthermore, the disclosure can take the form of computer program products implemented on one or more computer available storage media including computer available program code (include but not limit to a disk storage, a read-only optical disc and an optical storage).

The disclosure is described with reference to the flowcharts and/or block diagrams of products of method, apparatus (device) or computer program. It should be understood that each flow and/or block in the flowcharts and/or block diagrams and the combination of flows and/or blocks in the flowcharts and/or block diagrams can be realized via computer program instructions. These computer program instructions can be provided for processors of a general-purpose computer, a special-purpose computer, an embedded processor or other programmable data processing device to generate a machine so that the instructions executed by the processor of the computer or other programmable data processing device generate an apparatus configured to realize the functions designated by one flow or more flows in the flowcharts and/or one block or more blocks in the block diagrams.

These computer program instructions can also be stored in a computer readable storage that can instruct the computer or other programmable data processing device to work in a specific way so that instructions stored in the computer readable storage generate a manufacturing product including an instruction apparatus. The instruction apparatus realizes the functions designated by one flow or more flows in the flowcharts and/or one block or more blocks in the block diagrams These computer program instructions can also be loaded on the computer or other programmable data processing device so that a series of operation steps can be performed on the computer or other programmable device to generate the processing realized by the computer, thus providing steps for realizing the functions designated by one flow or more flows in the flowcharts and/or one block or more blocks in the block diagrams.

Although the preferred embodiments of the disclosure have been described, those skilled in the art can make additional variations and modifications to those embodiments once they learn of the basic inventive concepts. Therefore, the appended claims are intended to be construed to include both the preferred embodiments and all variations and modifications that fall within the scope of the disclosure.

Obviously, those skilled in the art can make modifications and variations to the disclosure without departing from the spirit and scope of the disclosure. Thus, if these modifications and variations of the disclosure fall within the scope of the claims of the disclosure and equivalent technologies thereof, the disclosure is also intended to include these modifications and variations.

The invention claimed is:

1. A time synchronization method, comprising:
   receiving, through a slave clock port, a time synchronization message sent by an upstream device;
   obtaining a message rate parameter in the time synchronization message, wherein the message rate parameter indicates a number of time synchronization messages received or sent per second;
   correcting a time synchronization message loss detection parameter, for detecting whether the time synchronization message is lost, of a slave clock port according to the message rate parameter; and
   keeping clock synchronization with the upstream device according to a correction result.

2. The method according to claim 1, wherein keeping clock synchronization with the upstream device according to a correction result comprises:
   if the time synchronization message sent by the upstream device is not received during a set duration with the corrected time synchronization message loss detection parameter as a reference, determining clock desynchronization with the upstream device.

3. The method according to claim 2, wherein after obtaining the message rate parameter in the time synchronization message, the method further comprises:
   updating a sending rate parameter, wherein the sending rate parameter is a rate parameter of the time synchronization message that is sent to a downstream device through a master clock port and is used to keep time synchronization with the downstream device; and
   sending the time synchronization message to the downstream device according to the updated sending rate parameter.

4. The method according to claim 3, wherein sending the time synchronization message to the downstream device according to the updated sending rate parameter comprises:

when the update of the sending rate parameter is determined, triggering the sending of the time synchronization message to the downstream device according to the updated sending rate parameter; or when the update of the sending rate parameter is determined, and a pre-determined time is reached, sending the time synchronization message to the downstream device according to the updated sending rate parameter.

5. The method according to claim 1, wherein after obtaining the message rate parameter in the time synchronization message, the method further comprises:

sending the time synchronization response message to the upstream device according to the obtained message rate parameter.

6. The method according to claim 5, wherein after obtaining the message rate parameter in the time synchronization message, the method further comprises:

updating a sending rate parameter, wherein the sending rate parameter is a rate parameter of the time synchronization message that is sent to a downstream device through a master clock port and is used to keep time synchronization with the downstream device; and sending the time synchronization message to the downstream device according to the updated sending rate parameter.

7. The method according to claim 6, wherein sending the time synchronization message to the downstream device according to the updated sending rate parameter comprises:

when the update of the sending rate parameter is determined, triggering the sending of the time synchronization message to the downstream device according to the updated sending rate parameter; or when the update of the sending rate parameter is determined, and a pre-determined time is reached, sending the time synchronization message to the downstream device according to the updated sending rate parameter.

8. The method according to claim 1, wherein after obtaining the message rate parameter in the time synchronization message, the method further comprises:

updating a sending rate parameter, wherein the sending rate parameter is a rate parameter of the time synchronization message that is sent to a downstream device through a master clock port and is used to keep time synchronization with the downstream device; and sending the time synchronization message to the downstream device according to the updated sending rate parameter.

9. The method according to claim 8, wherein sending the time synchronization message to the downstream device according to the updated sending rate parameter comprises:

when the update of the sending rate parameter is determined, triggering the sending of the time synchronization message to the downstream device according to the updated sending rate parameter; or when the update of the sending rate parameter is determined, and a pre-determined time is reached, sending the time synchronization message to the downstream device according to the updated sending rate parameter.

10. A time synchronization apparatus, the apparatus is operated in a terminal apparatus and comprises: a storage media storing computer-executable instructions; and one or more processors executing the computer-executable instructions to implement a plurality of program units, wherein the plurality of program units comprises:

an interface module, configured to receive, through a slave clock port, a time synchronization message sent by an upstream device;

a message rate parameter extracting module, configured to obtain a message rate parameter in the time synchronization message, wherein the message rate parameter indicates a number of time synchronization messages received or sent per second;

a message loss detection module, configured to correct a time synchronization message loss detection parameter, for detecting whether the time synchronization message is lost, of a slave clock port according to the message rate parameter; and a clock synchronization module, configured to keep clock synchronization with the upstream device according to a correction result.

11. The apparatus according to claim 10, wherein the clock synchronization module is configured to, if the time synchronization message sent by the upstream device is not received during a set duration with the corrected time synchronization message loss detection parameter as a reference, determine the clock desynchronization with the upstream device.

12. The apparatus according to claim 11, wherein the plurality of program units further comprising:

a message rate setting module, configured to update a sending rate parameter, wherein the sending rate parameter is a rate parameter of the time synchronization message that is sent to a downstream device through a master clock port and is used to keep time synchronization with the downstream device; and send the time synchronization message to the downstream device according to the updated sending rate parameter.

13. The apparatus according to claim 12, wherein the message rate setting module is configured to, when the update of the sending rate parameter is determined, trigger the sending of the time synchronization message to the downstream device according to the updated sending rate parameter; or when the update of the sending rate parameter is determined, and when a pre-determined time is reached, trigger the sending of the time synchronization message to the downstream device according to the updated sending rate parameter.

14. The apparatus according to claim 10, wherein the interface module is further configured to send the time synchronization response message to the upstream device according to the obtained message rate parameter.

15. The apparatus according to claim 14, wherein the plurality of program units further comprising:

a message rate setting module, configured to update a sending rate parameter, wherein the sending rate parameter is a rate parameter of the time synchronization message that is sent to a downstream device through a master clock port and is used to keep time synchronization with the downstream device; and send the time synchronization message to the downstream device according to the updated sending rate parameter.

16. The apparatus according to claim 15, wherein the message rate setting module is configured to, when the update of the sending rate parameter is determined, trigger the sending of the time synchronization message to the downstream device according to the updated sending rate parameter; or when the update of the sending rate parameter is determined, and when a pre-determined time is reached, trigger the sending of the time synchronization message to the downstream device according to the updated sending rate parameter.

17. The apparatus according to claim 10, wherein the plurality of program units further comprising:
a message rate setting module, configured to update a sending rate parameter, wherein the sending rate parameter is a rate parameter of the time synchronization message that is sent to a downstream device through a master clock port and is used to keep time synchronization with the downstream device; and send the time synchronization message to the downstream device according to the updated sending rate parameter.

18. The apparatus according to claim 17, wherein the message rate setting module is configured to, when the update of the sending rate parameter is determined, trigger the sending of the time synchronization message to the downstream device according to the updated sending rate parameter; or when the update of the sending rate parameter is determined, and when a pre-determined time is reached, trigger the sending of the time synchronization message to the downstream device according to the updated sending rate parameter.

* * * * *